United States Patent [19]

Fitzgibbon

[11] Patent Number: 4,710,759

[45] Date of Patent: Dec. 1, 1987

[54] INTERACTIVE CRT WITH TOUCH LEVEL SET

[75] Inventor: James Fitzgibbon, Lombard, Ill.

[73] Assignee: Zenith Electronics Corporation, Glenview, Ill.

[21] Appl. No.: 37,079

[22] Filed: Apr. 13, 1987

Related U.S. Application Data

[63] Continuation of Ser. No. 582,505, Feb. 22, 1984, abandoned.

[51] Int. Cl.⁴ .............................................. G09G 1/00
[52] U.S. Cl. ................................ 340/712; 340/365 P; 178/18
[58] Field of Search ............ 340/712, 365 P, 365 VL, 340/766, 524, 555, 753, 754, 709, 711; 367/907; 178/18

[56] References Cited

U.S. PATENT DOCUMENTS

| | | | |
|---|---|---|---|
| 3,764,813 | 10/1973 | Clement et al. | 340/365 P |
| 4,198,623 | 4/1980 | Misek et al. | 340/365 P |
| 4,199,758 | 4/1980 | Wilhelm et al. | 340/753 |
| 4,305,071 | 12/1981 | Bell et al. | 340/712 |
| 4,374,381 | 2/1983 | Ng et al. | 340/712 |
| 4,527,156 | 7/1985 | Nawrocki et al. | 340/753 |
| 4,591,710 | 5/1986 | Komadina et al. | 340/365 P |
| 4,672,364 | 6/1987 | Lucas | 340/712 |

OTHER PUBLICATIONS

IBM Tech. Disc. Bul., vol. 25, No. 8, Jan., 1983, "Dynamically Adjustable Capacitive Key Sensing Method", J. G. Irwin, Jr.

*Primary Examiner*—Gerald L. Brigance

[57] ABSTRACT

A touch panel level set for a CRT including a plurality of energy paths crisscrossing the faceplate of the CRT includes a microprocessor for energizing and interrogating the energy paths on a regular basis. A specific threshold level for each energy path is regularly determined by the microprocessor and retained in its memory. The specific threshold levels are used to compare the determined threshold levels in each energy path during interrogation thereof to ascertain whether the energy paths have been interrupted. Comparison is done on an analog basis with the memory output of the microprocessor being supplied through a D/A converter.

5 Claims, 3 Drawing Figures

INTERACTIVE CRT WITH TOUCH LEVEL SET

This application is a continuation of application Ser. No. 06/582505, filed 2/22/84, now abandoned.

BACKGROUND OF THE INVENTION AND PRIOR ART

This invention is directed generally to improvements in graphics display apparatus and specifically to cathode ray tube (CRT) display apparatus having touch panels for controlling the display of graphics responsive to a user touching selected areas on a CRT faceplate.

Conventional graphics display apparatus of the type under consideration include a CRT having a faceplate surrounded by a plurality of energy sources and detectors forming a network or grid of crossing energy paths closely adjacent to the viewing surface of the faceplate. Any interruption of crossing energy paths, for example by a user touching the faceplate, results in a signal to a CRT graphics controller for changing the graphics displayed in accordance with the area touched and the system software program. Thus the level of user skill and degree of user knowledge required for effective interaction with a computer terminal are greatly reduced to a simple ability to read and to touch. For obvious reasons such systems are very attractive and greatly enhance the marketability of computers.

A number of touch panel display system for CRTs are in existence. They generally comprise a plurality of light sources (usually light emitting diodes, i.e., LEDs) for generating light energy in the infrared range and suitable receptors for receiving such energy. The sources and receptors are usually positioned along the horizontal and vertical axes of the CRT faceplate. The prior art discloses a number of sophisticated systems for assuring the integrity of the energy paths and for delineating one path from another. The art also discloses well-known techniques for sequentially energizing the energy sources, deriving electrical signals representative of the intensity of the energy in each path and comparing the intensity of that energy to a predetermined threshold energy level. This process of interrogating the energy paths determines whether the paths have been interrupted. The predetermined threshold energy level is made sufficiently low to embrace the full range of energy levels in the paths, which vary significantly depending upon source characteristics, transmission media, accuracy of receptor alignment, and the like. While a significant improvement in minimizing the effects of ambient light on the touch display system has been effected with the use of bandpass amplifiers for restricting response to the energy wavelength of the source used, many problems remain with respect to positively determining whether an energy path has been interrupted or not.

OBJECTS OF THE INVENTION

The principal object of this invention is to provide an improved touch panel system for a CRT.

Another object of this invention is to provide a touch panel system for a CRT which obviates the problems of the prior art.

A further object of this invention is to provide a touch panel system for a CRT which automatically compensates for variations in energy sources.

SUMMARY OF THE INVENTION

In accordance with the invention, a CRT touch panel display system includes a grid of crossing energy paths defining unique areas of the faceplate of the CRT and includes a plurality of energy sources and receptors. Means are provided for interrogating each energy path and comparing the energy level therein with a threshold energy level which has been individually determined for that path and stored in memory. The system of the invention substantially eliminates any ambiguity in the response of the comparator in determining whether an energy path has been interrupted.

BRIEF DESCRIPTION OF THE DRAWINGS

These and other objects of the invention will become apparent by reading the following description in conjunction with the drawings in which.

DESCRIPTION OF THE PREFERRED EMBODIMENT

Figure 1:
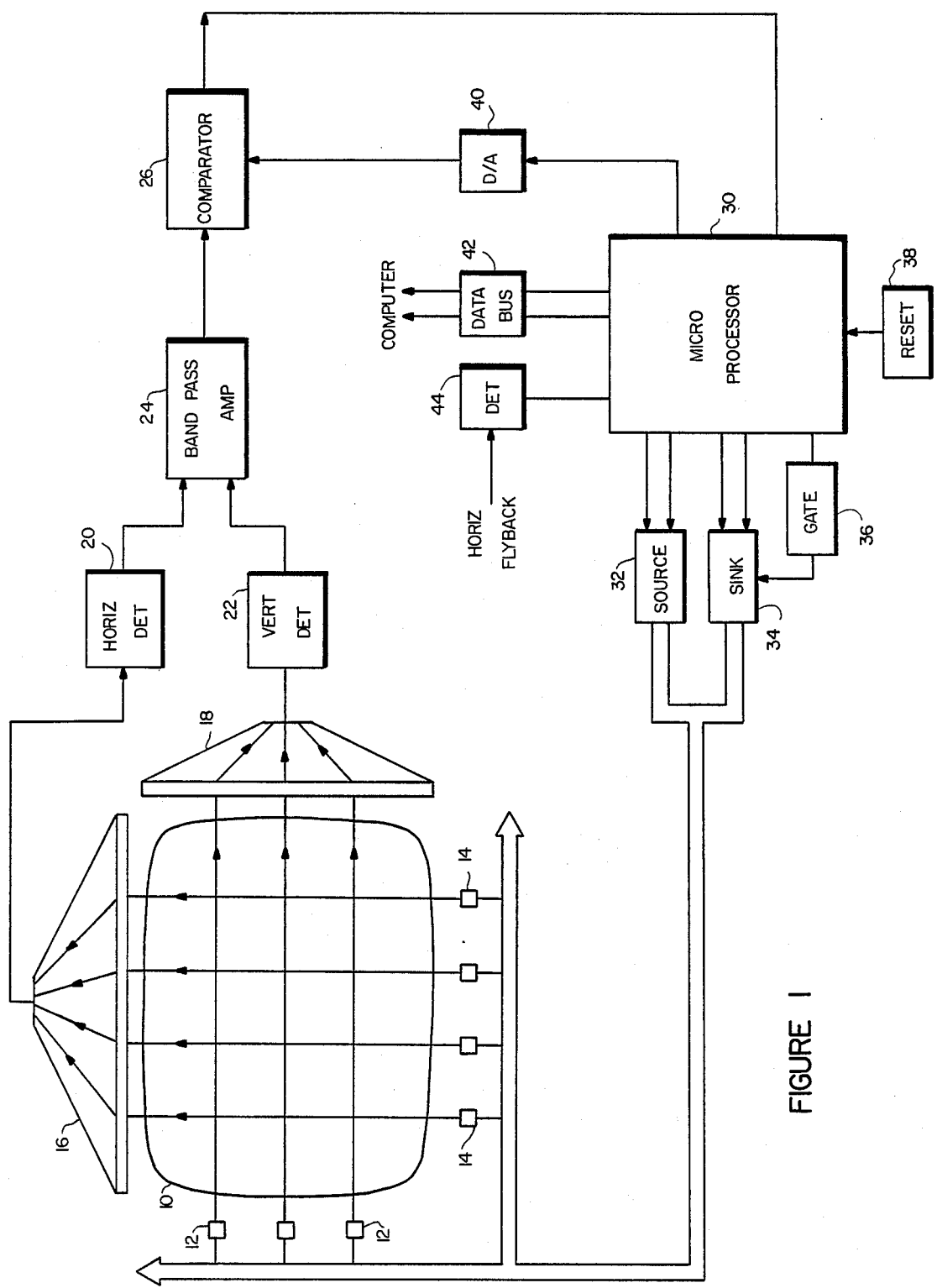
FIG. 1 represents a block diagram of a CRT touch panel display system constructed in accordance with the principles of the invention.

Referring to FIG. 1, a CRT having a faceplate 10 is diagrammatically shown with a plurality of vertically oriented LED light sources 12 and a plurality of horizontally oriented LED light sources 14 arranged parallel to the two principal axes of the CRT faceplate. A horizontally disposed light collector plate 16 and a vertically disposed light collector plate 18 are each disposed to receive and channel the light emitted from the oppositely disposed LED sources 12 and 14, to a horizontal detector 20 and to a vertical detector 22, respectively. This configuration of LED sources forming a grid of crossing energy paths adjacent to the faceplate of the CRT is well known in the art and needs no detailed discussion. Suffice it to say that the crossing horizontal and vertical energy paths define selected areas on the CRT faceplate which are uniquely identified by interruption of any two crossing energy paths. The output of the horizontal and vertical detectors is supplied to a bandpass amplifier which, as mentioned above, is effective to select substantially only the appropriate frequencies of the energy sources, thus effectively minimizing the effects of ambient light. The output of the bandpass amplifier is coupled to one input of a comparator 26, the other input of which is supplied from a D/A converter 40. The input of the D/A converter is coupled to a microprocessor 30.

Microprocessor 30 includes means for energizing LED power sources 32 and sinks 34 by means of a gate 36 for turning the LED sources 12 and 14 on and off, commonly referred to as "firing". This operation is conventional with the LEDs being sequenced in a precise regimen by the microprocessor which also "keeps track" of which energy path is activated at any given time. A detector 44 is supplied with a horizontal flyback pulse from a television receiver (not shown) for supplying a timing signal to the microprocessor. A reset circuit 38 is likewise included for control of microprocessor operation. A data bus is coupled to the microprocessor and is, in turn, coupled to another computer (not shown) for performing other functions not involved with this invention.

The microprocessor operation in sequentially energizing and interrogating the energy paths to find interrupted ones and thereby locate areas of the CRT faceplate that have been selected by a user, is well known. In the prior art, comparator 26 had one input established at an average voltge level against which the outputs of the detectors, representing received light intensity from the LEDs, were measured to determine whether energy paths were intact or whether they were interrupted. In accordance with this invention, a threshold voltage level for each LED is determined and stored in the microprocessor memory. When an energy path is interrogated, the specific threshold level for that path is read from the memory, converted to an analog voltage and applied to the comparator for determining whether the energy path has been interrupted. Hence, the many variables affecting the energy level in the path are eliminated and the ambiguity in determining whether a path has been interrupted is minimized.

Figure 2:
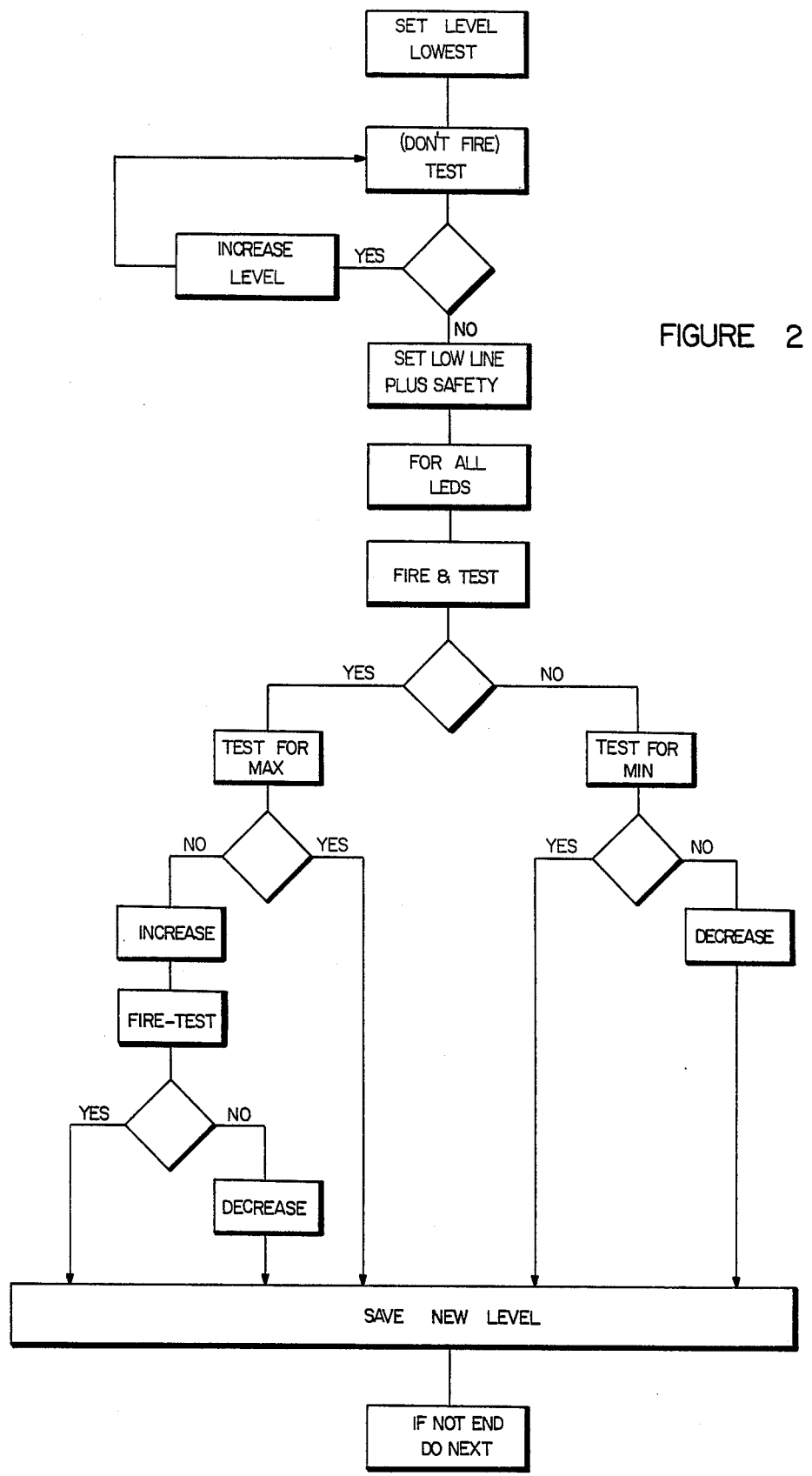
FIGS. 2 and 3 are flow charts of the microprocessor based circuit implementation of the preferred embodiment of the invention.
Figure 3:
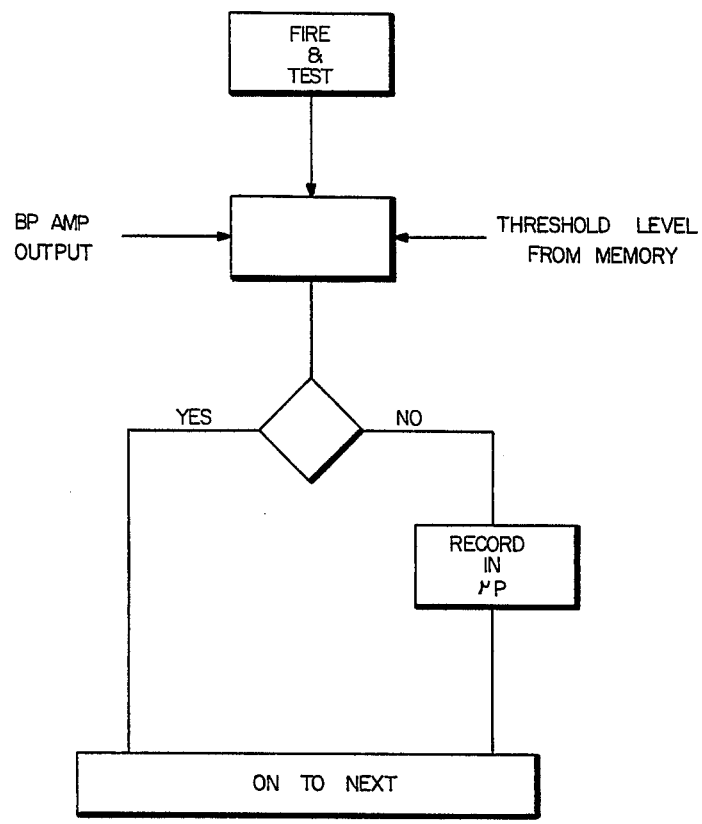

FIGS. 2 and 3 represent flow charts governing operation of the microprocessor implementation of the invention. The first portion of the flow chart of FIG. 2 is a set-up routine for establishing the nominal or base comparator voltage at the "noise floor". The technique involves setting the input level to the comparator as low as possible, while simulating an output of one half line voltage from the bandpass amplifier. The comparator reacts as though the LEDs have been fired and their light energy received and detected. The input voltage to the other comparator input is increased until the noise voltage is exceeded, at which time the output of the comparator goes to zero, indicating a "no light" being received condition. At that point a safety margin is introduced in the form of a further increase in comparator threshold level to guard against false readings. This level is the one against which the actual received energy levels in the individual paths are measured when the individual path thresholds are being determined.

The lower portion of the flow chart illustrates the determining of the individual threshold levels for the energy paths for retention in the microprocessor memory. The test sequence is repeated for each LED in the system. It involves firing the LED and comparing or testing the energy level in the path with the D/A-converted level determined for the comparator outputs. If the comparator output indicates light, the input to the comparator is tested against a maximum level, and if it is at maximum, this level is retained as the threshold for that energy path. If it is not at maximum, the input to the comparator is increased or incremented, and the process is repeated with the LED being fired again and tested. The sequence continues until a no light condition is received. When this occurs, the input to the comparator is decreased by a given amount and the resulting level is saved in the memory as the threshold level for that energy path. On the other hand, if the initial test indicates no light, the input level to the comparator is checked. If the input is not at minimum, it is decreased. If it is at the minimum, the level is stored in memory.

The routine is run for each energy path two to three times a second. Consequently, the threshold level for each energy path is continually being updated to compensate for changing conditions and to produce a very high confidence level in the accuracy of detecting an interrupted energy path.

In FIG. 3 a flow chart depicting operation of the system is shown. On a regular and periodic basis, each energy path is interrogated by the microprocessor to determine whether it has been interrupted. The first step is illustrated as a test in which the output of the bandpass amplifier is supplied to the comparator along with the threshold level from the microprocessor memory for each energy path. This, of course, is done during the period when the LED is fired. If the test results indicate that light is received, the energy path has not been interrupted and the program flow chart sequences to the next LED where the test procedure is repeated with the threshold level for the next fired LED being taken from memory and suppied to the comparator. A no light received condition indicates that the energy path has been interrupted and the comparator output supplied to the microprocessor is interpreted as an interruption. The program sequences to the next path for testing, etc. Circuitry within the microprocessor correlates the no light received conditions from the energy paths and determines the unique area of the CRT that has been touched to cause the break in the associated crossing energy paths. This interrogation routine is called many times more often than the set up and level set routine. As mentioned, setting of the threshold memory levels for the various energy paths regularly and often, substantially eliminates the adverse effects of LED source and receptor aging and misalignment, power line changes, etc. and minimizes ambiguity in determining when an energy path has been interrupted.

What has been described in a novel touch panel system for a CRT. It is recognized that numerous modifications and changes in the described embodiment of the invention will be apparent to those skilled in the art without departing from the true spirit and scope thereof. The invention is to be limited only as defined in the claims.

I claim:

1. In a touch control panel having a plurality of crossing energy paths and means for repetitively testing the energy levels in said paths against stored test levels for said paths to determine if an interruption, corresponding to a touch, has occurred, a method of updating the stored test levels for said paths comprising the steps of:
    energizing each of said paths in sequence;
    comparing the detected energy level in each of said paths with a nominal threshold level;
    A. (1) if the test indicates energy is detected, testing again with a maximum threshold level;
        (2) if at a maximum energy level, storing the maximum threshold level as the updated test level for that energy path;
        (3) if not at a maximum energy level, increasing the nominal threshold level and testing again;
        (4) continuing testing and increasing the threshold level until no energy is detected, and storing the last threshold level as the updated test level for that path;
    B. (1) if the test indicates no energy detected, testing for a minimum threshold level;
        (2) if at a minimum threshold level, storing the minimum threshold level as the updated test level for that path;
        (3) if the threshold level is not at a minimum, decreasing the threshold level by a predetermined amount; and
        (4) storing the decreased threshold level as the updated test level for that path.

2. The method of claim 1, further including the steps of:

A. (5) decreasing the threshold level by a preselected amount when a change from energy detection to no energy detection occurs; and (6) storing the decreased threshold level as the updated test level for that path.

3. The method of claim 2, further including comparator means having one input supplied with a signal representative of the energy level in a path and another input supplied with a signal corresponding to the threshold level.

4. The method of claim 3, further including the steps of regularly and frequently repeating the steps in A and B and continually updating the stored test levels for said paths.

5. In a touch control panel system having a plurality of crossing energy paths and means for repetitively testing the energy levels in said paths against stored test levels for said paths to determine if an interruption, corresponding to a touch, has occurred and including comparator means having one input supplied with a signal representative of the energy level in a path and another input supplied with a signal corresponding to a threshold level, a method of updating the stored test levels comprising the steps of:

energizing each of said paths in sequence;

applying a signal representative of path energy level to said comparator means;

applying a nominal threshold level signal to said comparator means;

A. (1) if the comparison indicates energy detection in the path, testing again with a maximum threshold level signal applied to said comparator means;

(2) if energy is still detected, storing the maximum threshold level as the test level for that energy path;

(3) if energy is not detected, increasing the nominal threshold level and testing again;

continuing testing with increased threshold levels until no energy is detected;

(4) decreasing the threshold level by a preselected amount when a change from energy detection to no energy detection occurs; and (5) storing the last threshold level as the updated test level for that path;

B. (1) if the comparison indicates no energy detection in the path, checking for a minimum threshold level;

(2) if at a minimum threshold level, storing the minimum threshold level as the updated test level for that path; and (3) if the threshold level is not at a minimum, decreasing the threshold level by a predetermined amount; and (4) storing the decreased threshold level as the updated test level for that path.

* * * * *